United States Patent [19]
Claus et al.

[11] Patent Number: 5,120,939
[45] Date of Patent: Jun. 9, 1992

[54] DATABASELESS SECURITY SYSTEM

[75] Inventors: David M. Claus, Indianapolis; Roy S. Coutinho, Carmel; Kevin D. Murphy, Indianapolis; James D. Snavley, Greenwood, all of Ind.; Kenneth R. Zempol, Randolph, N.J.

[73] Assignee: AT&T Bell Laboratories, Murray Hill, N.J.

[21] Appl. No.: 433,821

[22] Filed: Nov. 9, 1989

[51] Int. Cl.⁵ .................... G06F 15/30; G06K 19/073
[52] U.S. Cl. .................................. 235/382; 235/380; 235/492; 235/382.5; 902/26
[58] Field of Search ............ 235/379, 380, 382, 382.5, 235/492; 380/21, 23, 24, 25, 29; 902/2, 26

[56] References Cited

U.S. PATENT DOCUMENTS

| | | | |
|---|---|---|---|
| 3,403,380 | 9/1968 | Welch | 235/382.5 |
| 3,794,813 | 2/1974 | Spetz | 235/382 |
| 3,859,634 | 1/1975 | Perron et al. | 235/382 |
| 4,268,715 | 5/1981 | Atalla | 235/379 |
| 4,283,710 | 8/1981 | Genest et al. | 235/382.5 |
| 4,288,659 | 9/1981 | Atalla | 235/382 |
| 4,453,074 | 6/1984 | Weinstein | 235/380 |
| 4,471,216 | 9/1984 | Herve | 235/380 |
| 4,549,075 | 10/1985 | Saaba et al. | 235/492 |
| 4,558,211 | 12/1985 | Berstein | 235/379 |
| 4,746,788 | 5/1988 | Kawana | 235/492 |
| 4,779,224 | 10/1988 | Moseley et al. | 364/900 |
| 4,798,322 | 1/1989 | Bernstein et al. | 235/487 |
| 4,804,825 | 2/1989 | Bitoh | 235/492 |
| 4,890,323 | 12/1989 | Beker et al. | 380/25 |
| 4,935,962 | 6/1990 | Austin | 235/382 |

OTHER PUBLICATIONS

The quest for intruder-proof computer systems, K. Fitzgerald, IEEE Spectrum, Aug. 1989, pp. 22–26.
Federal Information Processing Standards Publication 46, Jan. 15, 1977, Specifications for the Data Encryption Standard.
Intel Article Reprint, AR-381, Feb. 18, 1985, Locking up System Security.
A Computer Dial Access Sytstem Based on Public-Key Techniques, J. K. Omura, (Cylink) IEEE—1987, pp. 73–79.
Hellman, M. "The Mathematics of Public Key Cryptography," Scientific American, Aug. 1979.

*Primary Examiner*—Robert Weihhardt
*Attorney, Agent, or Firm*—Michael A. Morra

[57] ABSTRACT

An improved security system, including a protable smart card and a host computer, eliminates the need for the computer to store individual personal identification (ID) numbers for each user seeking access to the computer. Instead, the computer stores a first encryption algorithm $E_1$ used in converting a particular identification number $(ID)_n$ into a secret code $S_n$ for that particular user. $S_n$ also exists within the memory of the smart card having been loaded into its memory at the time of issue. A challenge number C is generated by the computer and transmitted to the smart card. Within the smart card and the computer, microprocessors respond to the challenge number C, the secret code $S_n$, and a second encryption algorithm $E_2$ in order to generate response numbers $R_n$ and $R_n'$ respectively. Thereafter, $R_n$ is transmitted to the computer where it is compared with $R_n'$. A favorable comparison is necessary for gaining access to the computer.

24 Claims, 7 Drawing Sheets

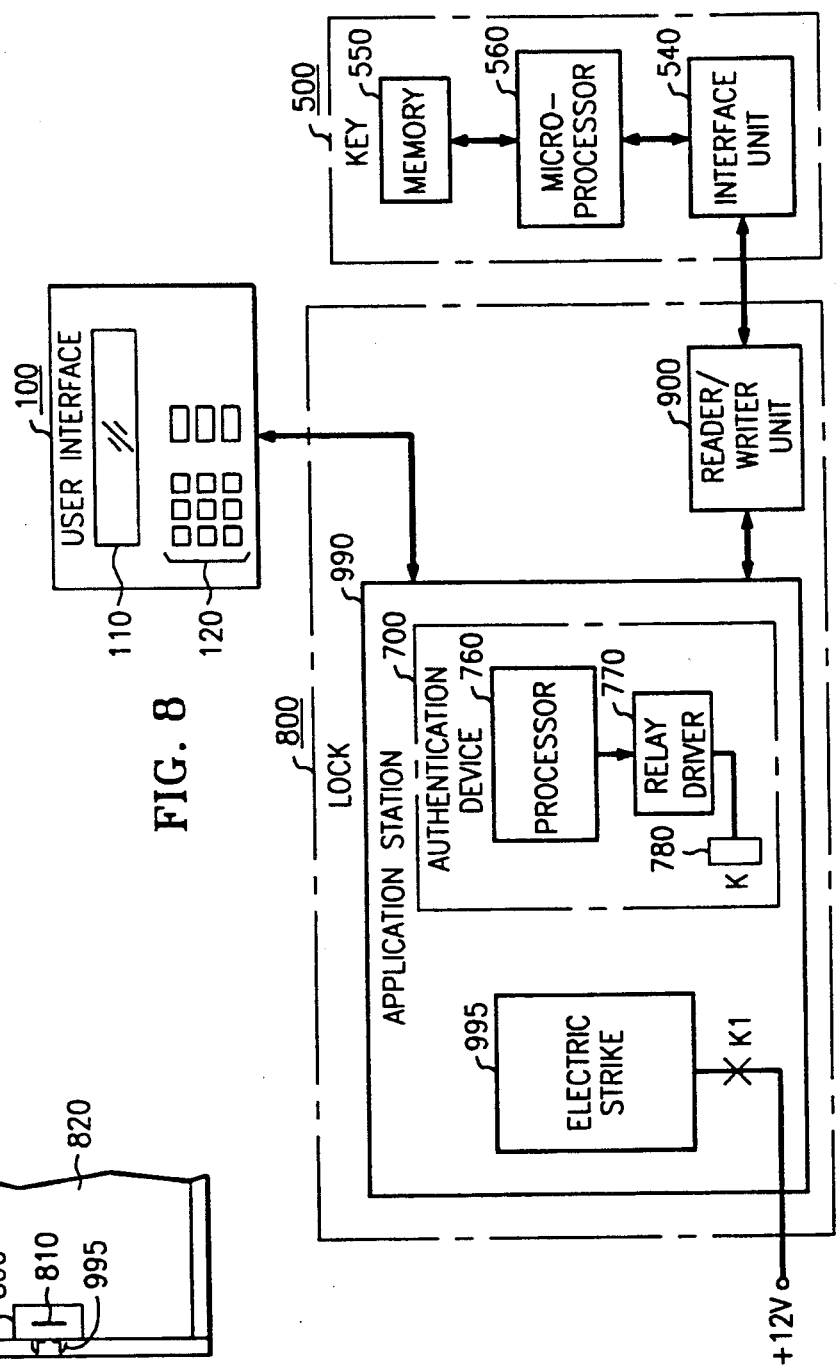

DATABASELESS SECURITY SYSTEM

TECHNICAL FIELD

The present invention relates to a system for granting access to a secure facility, and more particularly to an authentication procedure.

BACKGROUND OF THE INVENTION

Although we may be evolving toward a kinder and gentler civilization, there are still those who prefer to make money the old fashioned way, by stealing. It would therefore seem to be a good idea to protect goods in a similarly old fashioned way, under lock and key. Unfortunately, many who steal have achieved great expertise in circumventing old fashioned ways of protection and are ready for more sophisticated undertakings. Such expertise is not easily achieved, and requires great learning and diligence which, if properly channeled, might lead to even greater rewards. However, more than making money is involved. The thrill of an intellectual challenge is an important factor; witness the number of "hackers" seeking entry into government and industry computer systems, not for theft, but just to look around and create a little mischief, demonstrate their prowess, and perhaps even plant a software "bug" for good measure. A challenge also exists for those who provide secure facilities; namely, to exclude all unauthorized persons seeking entry while simultaneously making authentication procedures as convenient as possible for both authorized persons and facility administrators. Such goals are frequently incompatible with each other.

The use of a password is perhaps the simplest and least expensive technique for providing access security. Additionally, passwords are relatively easy to change. However, there are problems with passwords; when they are fixed for long periods of time the chances of guessing them are improved; and when they are changed too frequently, they are forgotten by the rightful users. Further, when passwords are transmitted across an interface, they can be intercepted by anyone with the proper monitoring equipment.

In one known system, a common secret code is stored within each of two devices (key and lock). The secret codes are logically combined with a random number, available to each device, and the resulting numbers are compared with each other for identity. This technique is generally employed by various data communication systems (see e.g., "Locking Up System Security"—Electronics Week Feb. 18, 1985 regarding Intel Corporation's 27916 KEPROM TM Keyed Access EPROM). Advantageously, the secret code itself needs never be transmitted so that an electronic intruder, monitoring interface signals, sees only the random data (challenge) and the modified random data (response) which are insufficient to teach the correct response to subsequent challenges. Unfortunately, this technique stores the same secret code in all keys which precludes selective revocation of lost or stolen keys.

One way to prevent tampering with private information in electronic systems is the use of cryptosystems (i.e., methods for encrypting, or transforming, information so that it is unintelligible and, therefore, useless to those who are not meant to have access to it). Ideally, the transformation of the information is so complicated that it is beyond the economic means of an eavesdropper to reverse the process. The eavesdropper is therefore not inclined to become an intruder who not only would compromise the confidential nature of the stored information, but also might engage in forgery, vandalism and theft. A popular technique, known as public-key cryptography, relies on the use of two keys—one to encode the information and another to decode it. These keys are related in the sense that they serve to specify inverse transformations; however, it is computationally infeasible to derive one key from the other. That being the case, one of the keys can be made public for improved convenience without compromising the security of such a system. Applying public-key cryptography to the challenge of excluding unauthorized persons seeking entry to a secure facility, the party seeking entry would use his private key to encrypt (authenticate) a message. The party receiving the encrypted message would use the public key of the transmitter to decrypt the incoming message in order to transform it to its original text. A discussion of such systems is contained in the August, 1979 issue of Scientific American in an article by Martin E. Hellman entitled "The Mathematics of Public-Key Cryptography." An example of a public-key system is disclosed in U.S. Pat. No. 4,453,074 issued to S. B. Weinstein for a "Protection System for Intelligent Cards." Unfortunately, in public-key systems, the party receiving the encrypted message must maintain a database that contains the public keys of all parties having authorization to enter the secure facility.

One particularly promising system involves the use of a password along with a smart card that exchanges data with an authentication device during an authentication procedure. It is noted that the smart card contains a processor and a memory; it is portable and frequently has the shape of a conventional credit card. Security is improved by requiring the holder of the smart card to remember a password. This password can either be sent to the smart card enabling it to exchange data with the authentication device, or the password can be sent directly to the authentication device itself. In either case, two conditions must now be satisfied: something in the user's head and something in the user's hand.

A known system stores an identification (ID) number within each smart card which is transmitted to the authentication device in order commence the authentication procedure. The authentication device scrutinizes the ID number to determine whether it corresponds to a presently valid ID number and then commences the authentication procedure only when the result is affirmative. Such a system is disclosed in U.S. Pat. No. 4,471,216. While personal identification numbers additionally offer the ability to improve flexibility (e.g., expiration date may be built into the ID itself), the storage of each individual ID number in the authentication device requires significant memory space. For example, storing 25,000 user keys, each 8 bytes long, requires 200K bytes of memory. Further, each time a new smart card is issued, the memory of the authentication device must be updated to recognize it. This is particularly impractical in a distributed system where, for example, the authentication device is used in connection with room or building access. Even when the authentication device comprises a host computer that is easily updated, it is undesirable from a security standpoint to store all ID numbers therein because they might be compromised if someone found a way to break into the computer.

SUMMARY OF THE INVENTION

A security system includes a portable object, such as a smart card, and an authentication device for electrically interacting with the portable object to regulate access to a secure facility. An identification number $(ID)_n$ is presented to the authentication device which uses an encryption algorithm, $E_1$, to convert it into a secret code $S_n$. The authentication device also generates a challenge number, C, which is transmitted to the portable object. Stored within the portable object is secret code $S_n$ and encryption algorithm $E_2$ which are used together with the challenge number C to create a response signal $R_n$. Stored within the authentication device is encryption algorithm $E_2$, which is used together with secret code $S_n$ and the challenge number C to create response signal $R_n'$. A favorable comparison between $R_n$ and $R_n'$ is necessary to gain access to the secure facility.

In an illustrative embodiment of the invention, $E_1$ and $E_2$ are identical processes that use different master strings (secret keys) to transform a first binary number into a second binary number. Knowledge of the encryption algorithm, however, is insufficient for an intruder to determine the master string. The present invention illustratively uses the Data Encryption Standard (DES) in the implementation of $E_1$ and $E_2$.

In a preferred embodiment of the invention, challenge number C is a 64-bit random number. Such numbers are generally non-repeating and enhance security by virtue of their non-predictable character.

The present invention advantageously regulates access to any one of a number of protected resources including information, cash, and physical entry into a facility without requiring the transmission of secret information across an interface. Importantly, the present invention eliminates the need to store and administer identification information regarding each user entitled to access to the protected resources.

It is a feature of the present invention that multiple secret codes are easily stored within a smart card, each providing access to a different facility, or backup access to the same facility in the event of a security breach (e.g., the master string becomes known). In the situation that security is breached, new secret codes can be derived at the authentication device by merely using a new master string. Such new secret codes would have already been stored within each smart card at the time of issue as a precautionary measure. Thus, should security become compromised, new smart cards do not need to be issued.

These and other features of the present invention will be more fully understood when reference is made to the detailed description and associated drawing.

BRIEF DESCRIPTION OF THE DRAWING

FIG. 7 illustrates use of the present invention in a premises access security system in accordance with the invention;

FIG. 8 discloses the functional components of a door lock such as used in connection with FIG. 7;

DETAILED DESCRIPTION

General

Figure 1:
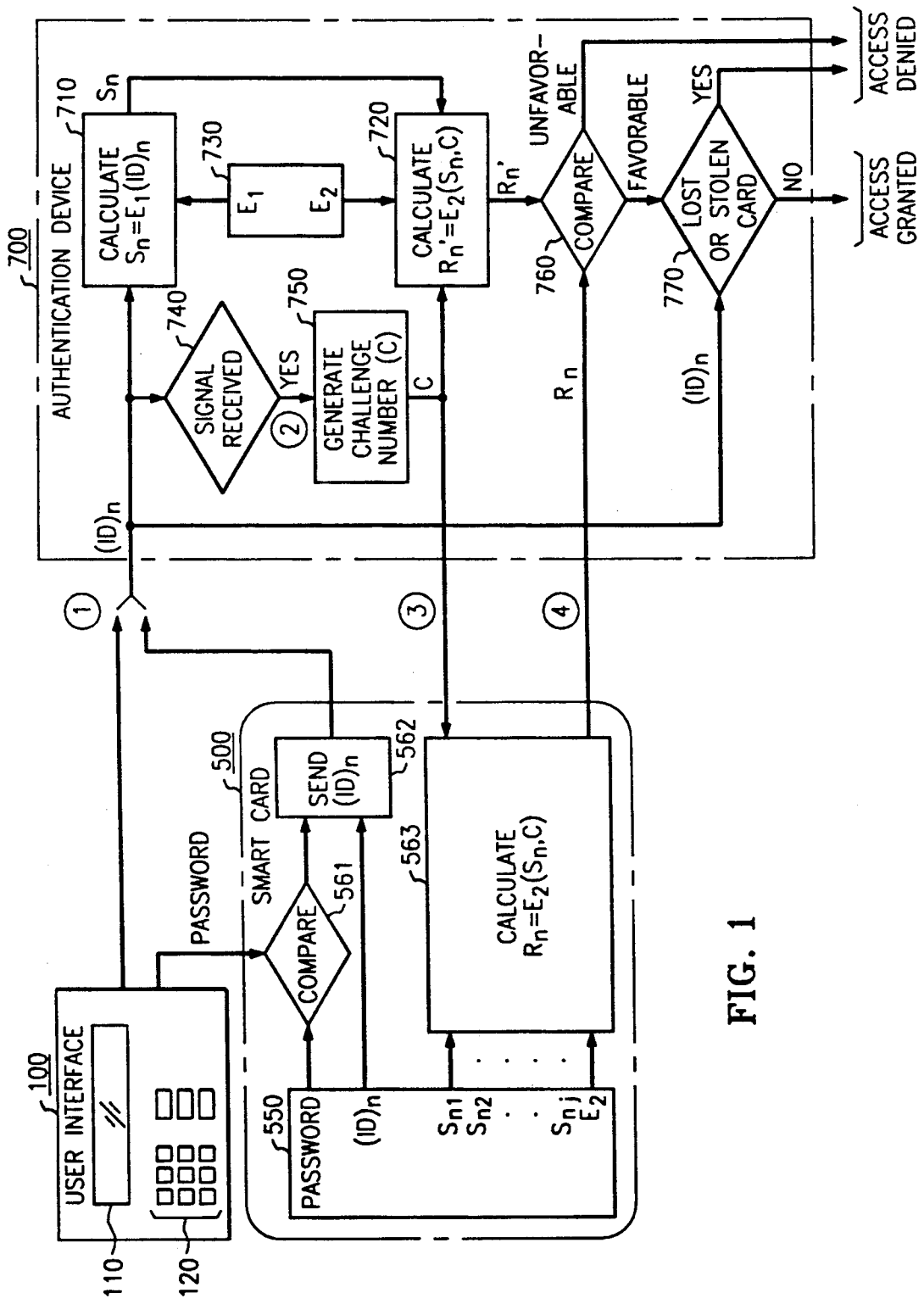
FIG. 1 is a flow diagram illustrating the various steps performed in practicing the invention.

Referring to FIG. 1, there is disclosed a diagram which illustrates the salient features of the invention in modified flow chart form. The mechanical analog of a key and a lock is useful in connection with FIG. 1 because smart card 500 functions as a key and authentication device 700 functions as a lock. Since the authentication process requires activity on the part of both the smart card and the authentication device, the activity associated with each part is segregated to assist the reader in understanding the invention. Although not required in the practice of the invention, security is enhanced by requiring the holder of the smart card to enter a password into the smart card, enabling it to commence the authentication process by transmitting a personal identification number $(ID)_n$ to authentication device 700. Alternatively, the holder of the smart card could directly transmit $(ID)_n$ to the authentication device 700. In either case, the following steps describe the authentication process: (1) In response to the receipt of a signal such as $(ID)_n$, box 740 recognizes the signal and initiates the generation of a challenge number. Additionally, secret code $S_n$ is created (box 710) using encryption algorithm $E_1$ (box 730) and the proffered personal identification number $(ID)_n$. (2) Challenge number C is generated (box 750), transmitted to smart card 500, and used internally (box 720). Note that a valid ID number is not required to initiate the generation of a challenge number—a feature that helps preserve confidentiality of the ID number. (3) Both the smart card 500 and the authentication device 700 (box 563 and box 720) calculate a response ($R_n$ and $R_n'$ respectively) to the challenge number. Since secret code $S_n$ and encryption algorithm $E_2$ are contained in both the smart card and in the authentication device, the responses should be identical when compared (box 760). (4) Block 770 further enhances security, with minimum inconvenience to the system administrator, by testing whether the proffered $(ID)_n$ corresponds to a lost or stolen card. The list of such cards is presumably small and is seldom updated. Once all of the above steps have been successfully completed, access to the computer is granted, a door is opened, a credit transaction is validated, or cash is delivered, etc.

The various boxes need not reside within the particular device as shown in FIG. 1. For example, in a number of applications, the challenge number generator can be located within the smart card while still preserving the benefits of the invention. Indeed, in the peer-to-peer authentication application described hereinafter, each smart card contains a challenge number generator, means for comparing response numbers, and the $E_1$ algorithm including a master string. Further, user interface 100 can be built into the smart card 500 or the authentication device 700. It is an important advantage that the list of valid ID numbers need not be stored within the authentication device. It is sufficient that only the encryption algorithm $E_1$, originally used to create $S_n$ from $(ID)_n$, needs to be stored.

Stored within memory box 550 of smart card 500 is the above-identified personal identification number $(ID)_n$ that is unique to that card. Also stored within box 550 are one or more secret codes $S_n$ and encryption algorithm $E_2$.

Secret code $S_n$ comprises a plurality of binary digits stored in memory that are not accessible from outside the card. Further, $S_n$ is written into memory at a time when the ID number is first assigned by the card issuer. $S_n$ is linked to a particular personal identification number, designated, $(ID)_n$ by the functional relationship $S_n = E_1 (ID)_n$. What this means is that encryption algorithm $E_1$ maps each unique personal identification number into a unique secret code. As a practical matter, a secret computer program transforms input signal $(ID)_n$ into output signal $S_n$. It is the use of this particular transformation that eliminates the need to store individual ID numbers. More will be said about this later.

Encryption algorithm $E_2$ is a computer program executed by a microprocessor. It is jointly responsive to secret code $S_n$ and to input binary data signal C for generating an output binary data signal $R_n$. Computation of $R_n$ is indicated in box 563 where C is the challenge number and $R_n$ is the response. For improved security, C is a large non-repeating number so that an intruder making a large number of observations of the challenge and response will never learn the manner by which they are related. So long as C and $S_n$ are finite, however, it is theoretically possible for the determined intruder to learn the correct response to all challenges. Nevertheless, with a moderate length secret code, say 64 bits, there are approximately $18 \times 10^{18}$ possible unique secret code combinations. Even with a computer aided lockpick that tried 10 billion different combinations every second, it would take 57 years to examine all combinations. This period could be lengthened substantially if additional delay, say 1 second, was introduced between challenge and response. By way of example, and not limitation, C may be a random number, pseudorandom number, or even a time clock (year: month: day: hour: seconds: tenths: etc.).

Stored in box 770 are the ID numbers of lost and stolen cards as well as ID numbers that have expired or, for one reason or another, no longer have permission to access the facility. Advantageously, even though the authentication device "knows" at the outset that the proffered ID number is unacceptable, access to the facility is not denied until the entire process has been completed. Thus, only minimum information is given to potential intruders. Storing a list of unacceptable ID numbers allows customization with minimum susceptibility to fraud. There is little or no incentive to increase the list of unacceptable ID numbers; while on the other hand, a great temptation exists to fraudulently increase the list of acceptable ID numbers—a temptation that the present invention eliminates.

Data Encryption Standard (DES)

The purpose of any encryption algorithm is to convert confidential information (data) into a form that renders it unreadable to all except those who know how to decode the message. One simple technique involves substituting one letter of the alphabet with another for each of the letters. Such encryptions, however, are relatively easy to decrypt, even for the unsophisticated intruder. More complex techniques have arisen over the years to stay ahead of unsolicited decryption experts, and the art has progressed to the point that techniques exist that are so good that it no longer makes sense to try to unravel an encryption signal. One such technique that has gained wide acceptance is the Data Encryption Standard (DES) that is intended for implementation in special purpose electronic devices. In 1977, the National Bureau of Standards (now NIST) issued DES as a Federal standard, and the National Security Agency has certified new products using the standard. While a relatively brief discussion of the application of DES to the invention is set forth below, a more comprehensive treatment is set forth in the Jan. 15, 1977 Federal Information Processing Standards Publication 46 (FIPS 46), entitled "Specifications for the Data Encryption Standard."

DES is a private-key scheme in which both encrypting and decrypting keys are identical and secret. DES operates on data in blocks of 64-bits, sending it through 16 stages of the algorithm before exiting as a 64-bit cipher text. Encryption relies heavily on proper management of keys—the strings of characters that must be input to the algorithms before encryption or decryption can take place. The present invention does not require decryption, but rather relies on a comparison between two encrypted signals. Encryption algorithms $E_1$ and $E_2$ each use DES to achieve encryption; however, the data blocks and keys are obtained from different sources. After a brief explanation of DES is given, it will be applied to the present invention.

Figure 2:
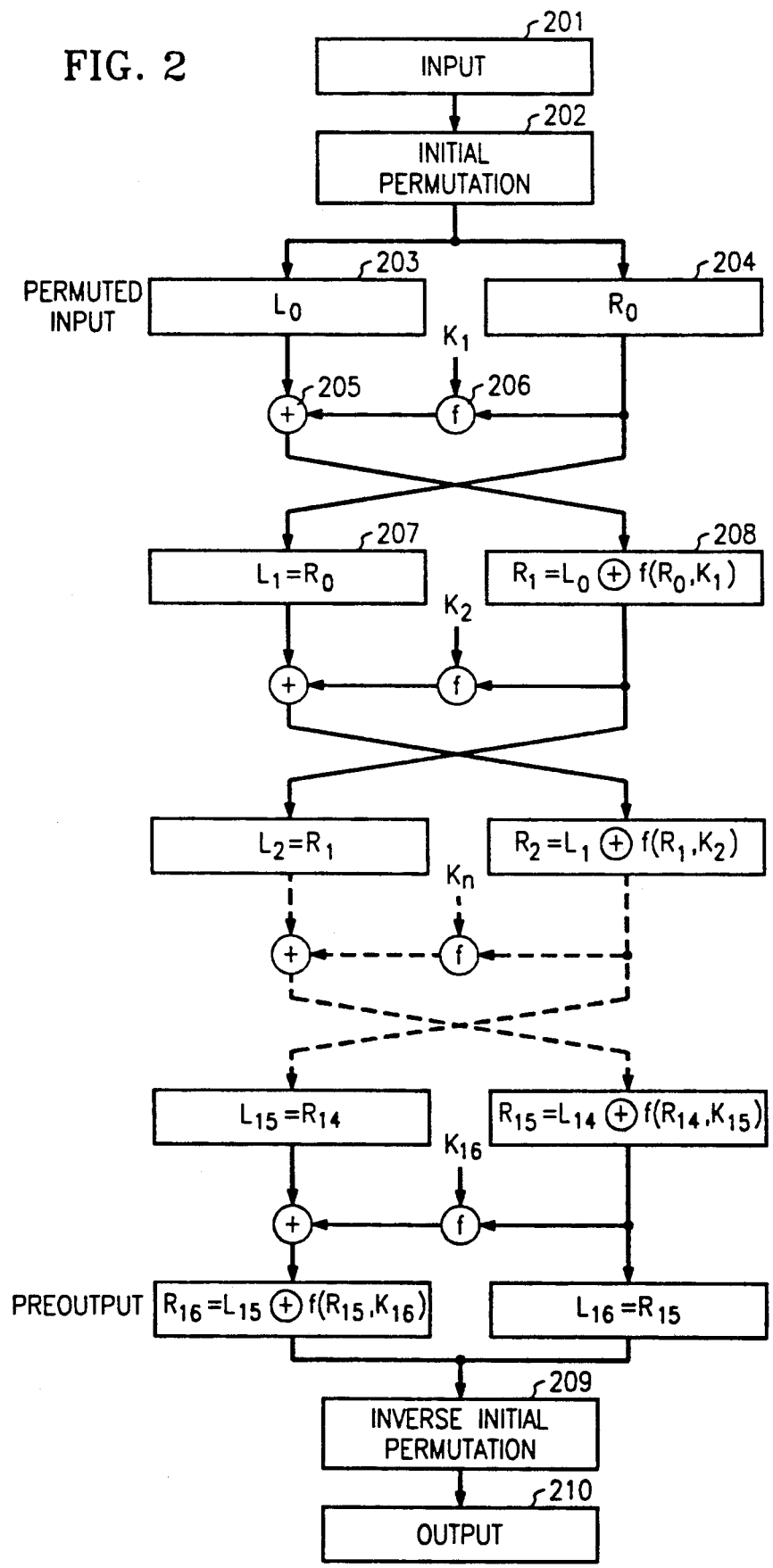
FIG. 2 is a flow diagram of the enciphering computation of the Data Encryption Standard.

A flow diagram that illustrates the sequential operations performed in the DES enciphering computation is shown in FIG. 2. Input box 201 comprises a 64-bit ordered set (vector) of binary digits whose order is rearranged (permuted) according to a known pattern in an operation akin to shuffling cards. The permuted block of 64-bits is now split into two boxes 203 ($L_0$) and 204 ($R_0$), each comprising 32-bits in an operation akin to cutting the cards. At this point, the card shuffling analogy fails because mathematical operations 205 (modulo-2 addition) and 206 (cipher function f) are introduced along with key K. Values for $K_1 \ldots K_{16}$ are selected in accordance with 16 different predetermined schedules wherein each $K_n$ comprises an ordered set of 48-bits chosen from the 64-bit key.

Figures 3, 4:
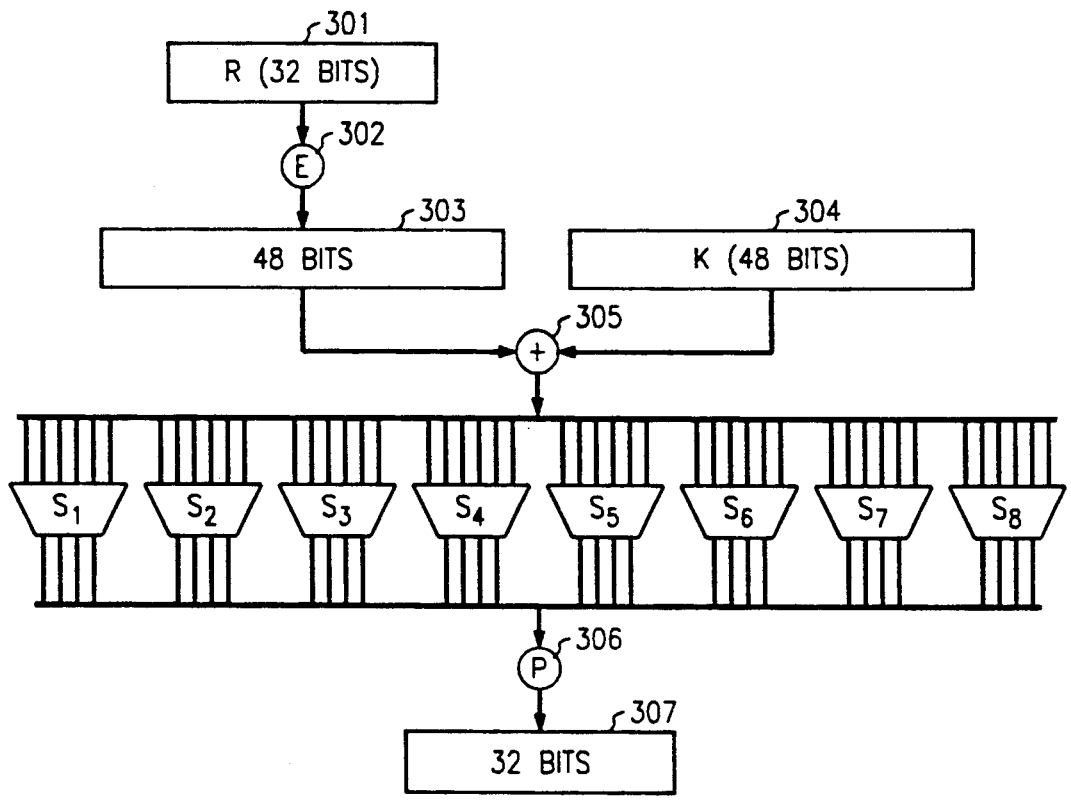
FIG. 3 is a block diagram that illustrates the calculation of f(R,K) used in the Data Encryption Standard.
FIG. 4 discloses selection table $S_1$ used in the Data Encryption Standard.

For completeness, the operation of cipher function (f) is shown in FIG. 3 where the calculation f(R, K) is diagrammatically laid out. In this figure, E denotes a function which takes a block of 32-bits as input and yields a block of 48-bits as output. The E function is very similar to the initial permutation of box 202, but now certain of the bits are used more than once. These blocks of 48 bits, designated 303 and 304 in FIG. 3, are combined by modulo-2 (exclusive or) addition in box 305. Selection functions $S_1, S_2, \ldots S_8$ take a 6-bit input number and deliver a 4-bit output number in accordance with a predetermined selection table such as shown in FIG. 4 which discloses the $S_1$ function. For example, if $S_1$ is the function defined in this table and B is a block of 6 bits, then $S_1(B)$ is determined as follows: The first and last bits of B represent, in base 2, a number in the range 0 to 3. Let that number be i. The middle 4 bits of B represent, in base 2, a number in the range 0 to 15. Let that number be j. Look up in the table the number in the i'th row and j'th column. It is a number in the range 0 to 15 and is uniquely represented by a 4-bit block. That block is the output $S_1(B)$ of $S_1$ for the input B. Thus, for input 011011 the row is 01 (i.e., row 1) and the column is determined by 1101 (i.e., column 13). In row 1, column 13 the number 5 appears so that the output is 0101. Selection functions $S_1, S_2, \ldots S_8$ appear in the Appendix of the above-mentioned publication FIPS 46.

Referring once again to FIG. 3, the permutation function P is designated 306 and yields a 32-bit output (307) from a 32-bit input by permuting the bits of the input block in accordance with table P, also set forth in FIPS 46.

Encryption Algorithms $E_1$ and $E_2$

Figure 9:
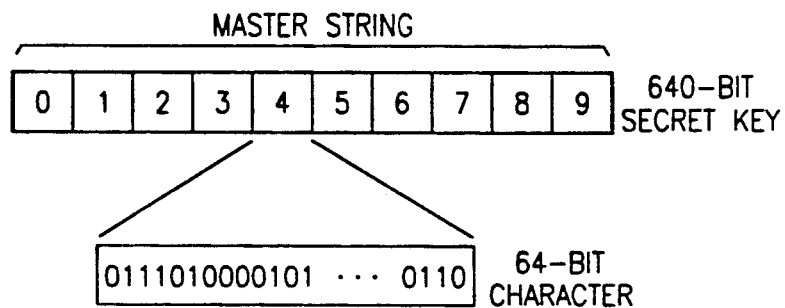
FIG. 9 illustrates the structure of a master string used in the encryption process.

DES is now applied to encryption algorithm $E_1$ which is used to convert $(ID)_n$ into $S_n$. Note that when the smart card is issued, it comes equipped with $S_n$ already stored in its memory. Reference is now made to FIG. 9 which illustrates the structure of the master string which comprises 640-bits of secret data used by the encryption algorithm $E_1$. The master string is interpreted as 10 separate characters (addressable by digits 0-9), each having 64 bits of data. The ID number comprises a block of 6 digits, each assuming some value between 0 and 9 inclusive. In the following example, encryption algorithm $E_1$ operates on $(ID)_n$ (illustratively set equal to 327438) in the manner indicated. The first operation requires that the third character of the master string be combined with the second character of the master string in accordance with the DES enciphering computation. This operation is denoted $d(3,2)$ where 3 is treated as the data block and 2 is treated as the key. The operation performed is shown in FIG. 2 in which the 64-bit number corresponding to the third character of the master string is used as input 201, the 64-bit number corresponding to the second character of the master string is used as K, and output 210 is a 64-bit number (designated "A") that will be used in a second operation.

The second operation performed is similar to the first except that "A" is combined with the seventh character of the master string in accordance with the DES enciphering computation. This operation is denoted by $d(A,7)$ where A is a 64-bit number used as input 201, and the 64-bit number corresponding to the seventh character of the master string is used as K. The operation performed is shown in FIG. 2 and output 210 is a 64-bit number (designated "B") that will be used in a third operation.

These operations continue until all of the digits of $(ID)_n$ are used. The last operation, $d(D,8)$, results in a 64-bit number which is used as the secret code $S_n$. Accordingly, in this example, encryption algorithm $E_1$ uses the digits of $(ID)_n$ to index characters of the master string. The DES enciphering computation shuffles these secret keys in a known, but non-reversible, manner to generate $S_n$.

DES is now applied to encryption algorithm $E_2$ which is used to convert $S_n$ and C into a response number $R_n$ (within the smart card), or $R_n'$ (within the authentication device). $S_n$ and C each comprise a 64-bit number which makes them ideally suited for the encryption computation shown in FIG. 2. Indeed, $S_n$ and C are "shuffled" in accordance with the DES enciphering computation described above (see FIG. 2), and output box 210 now contains a 64-bit number designated $R_n$ or $R_n'$. These numbers are thereafter compared, and when they are identical the smart card is deemed to be authenticated. Although the DES enciphering computation is illustratively shown, it is understood that other enciphering computations, having greater or lesser complexity, may be used without departing from the spirit of the invention.

Challenge Number Generator

Figure 11:
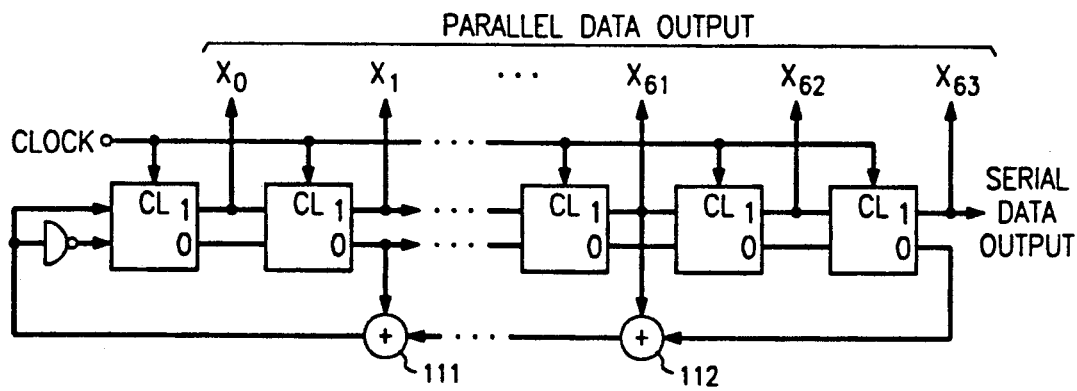
FIG. 11 discloses a pseudo-random number generator suitable for use as a challenge number generator.

There are many techniques for generating suitable challenge numbers. Ideally such numbers are long, non-predictable, non-repeating and random. One known technique involves periodically sampling the polarity of a noise source, such as an avalanche diode, whose average dc output voltage is zero. As discussed above, the challenge number generator 750 (FIG. 1) may generate a random number, a pseudo-random number, or even a predictable number—depending on the degree of security warranted in the given application. One challenge number generator is shown in FIG. 11 which provides a pseudo-random number at its serial data output. The generator comprises a 64-stage shift register whose output is modulo-2 combined (via Exclusive-OR gates 111, 112) with various of its stages and then fed back to the input of the generator. Although the serial data output pattern is very long (potentially generating all possible combinations of 64 bits), it eventually repeats itself. Nevertheless, by accelerating the clock rate at times when a challenge number is not needed, it would be most difficult to predict which particular combination of 64 bits was coming next.

The randomness of the challenge number is further improved by using the DES enciphering computation shown in FIG. 2. Here, the Parallel Data Output $(X_0, \ldots X_{63})$ of the pseudo-random number generator shown in FIG. 11 is used as input 201 in FIG. 2, while one character of the secret master string is used in obtaining the various values for K. Recall that values for $K_1 \ldots K_{16}$ are selected in accordance with 16 different predetermined schedules wherein each $K_n$ comprises an ordered set of 48-bits chosen from a 64-bit key. Since the software needed to implement DES, or the particular encryption algorithm used, is already in place in both the smart card and in the authentication device, it is cost effective to use it in connection with the generation of a challenge number. Indeed, if DES is used in forming the challenge number, it would be sufficient to increment a register each time a new challenge number is needed, and then use that number, rather than $X_0, \ldots X_{63}$, as input 201 in FIG. 2.

Smart Card

Figure 5:
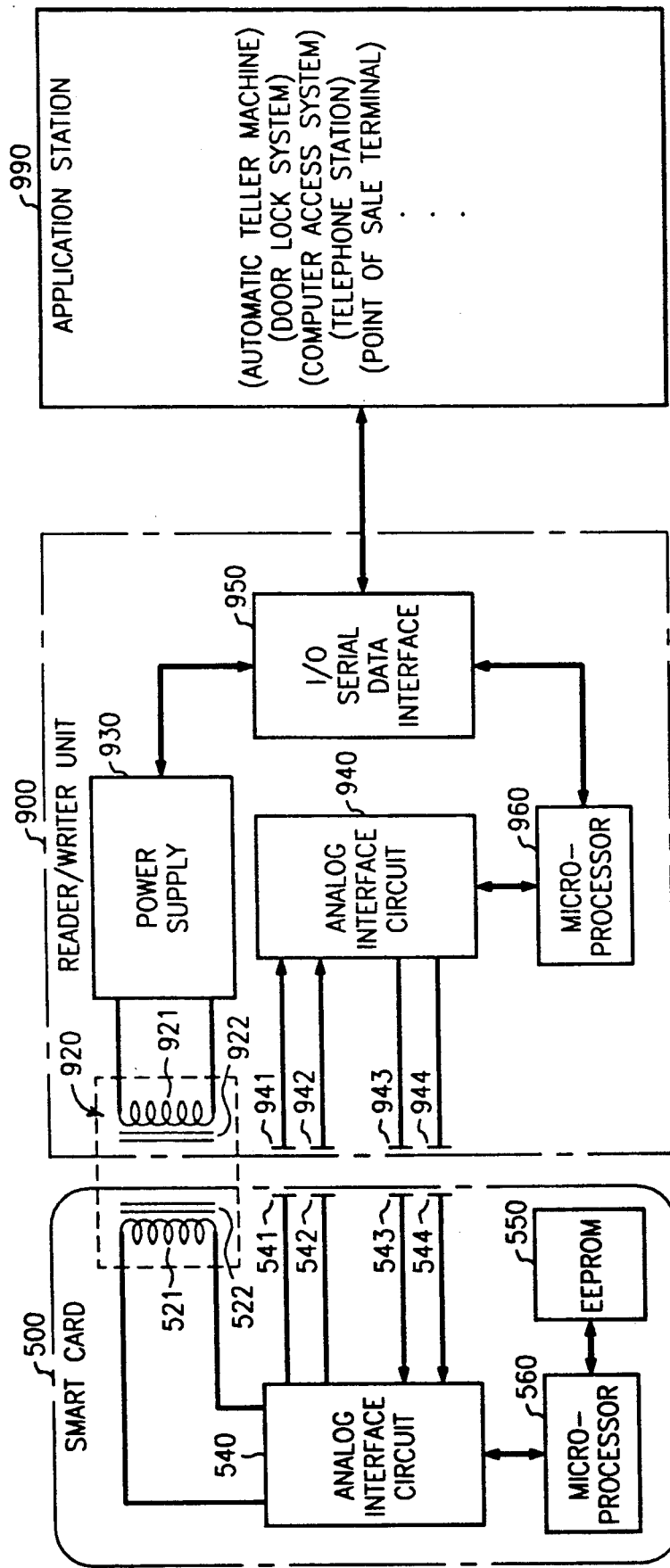
FIG. 5 is a block diagram representation of the major functional components of a smart card system and their general interconnection with each other.

Referring now to FIG. 5 there is disclosed a block diagram of a smart card 500 and a reader/writer unit 900 such as used in connection with the present invention. Although shown in greater detail in U.S. Pat. No. 4,798,322, a brief description is presented here. Some of the principal components located on smart card 500 are microprocessor 560, electrically erasable programmable read-only memory (EEPROM) 550, analog interface circuit 540, secondary winding 521 of transformer 920, and capacitive plates 541-544.

Microprocessor 560 includes a central processing unit and memory means in the form of random access memory and read-only memory. A microprocessor available from Intel Corporation such as Part No. 80C51 may be used with the proper programming. Operating under firmware control provided by its internal read-only memory, the microprocessor 560 formats data to the EEPROM 550 and to the reader/writer unit 900 via the analog interface circuit 540. EEPROMS are available from a number of suppliers, many of whom are mentioned in an article entitled "Are EEPROMS Finally Ready to Take Off?" by J. Robert Lineback, Electronics, Vol 59, No. 7, (Feb. 17, 1986), pp. 40-41. Data may be written to or used from an EEPROM repeatedly while operating power is being applied. When operating power is removed, any changes made to the data in the EEPROM remain and are retrievable whenever the smart card 500 is again powered.

The analog interface circuit 540 provides a means for interfacing smart card 500 with reader/writer unit 900. Within analog interface 540 are circuits responsive to capacitors 541-544, for exchanging data with reader/writer unit 900. Power for operating the card 500 is provided to the analog interface circuit 540 via inductive transfer, received by the secondary winding 521 of transformer 920. This transformer is formed when secondary winding 521 is coupled to a primary winding 921 within the reader/writer unit 900. The transformer 920 may advantageously include a ferrite core 922 in the reader/writer for increased coupling between the transformer primary winding 921 and secondary winding 521. A second such core 522 may also be included in the transformer 920 to further increase coupling efficiency. The primary winding 921 is driven at a 1.8432 MHz rate by power supply 930 whose operation is described with particularity in U.S. Pat. No. 4,802,080 issued Jan. 31, 1989.

Within the reader/writer unit 900, analog interface circuit 940 exchanges data with the smart card 500 under control of microprocessor 960. Capacitor plates 941-944 are aligned with the mating capacitor plates 541-544 within the smart card 500. The input/output serial data interface 950 is basically a universal asynchronous receiver transmitter (UART) which may be advantageously included in the microprocessor 960. This UART is used for externally communicating with a suitably configured application station 990.

Application station 990 represents any one of a variety of stations, terminals or machines capable of interacting with the reader/writer unit 900 for the purpose of selectively granting access to the resources which it controls such as cash, premises access, information in a computer, credit authorization for a telephone call or the purchase of goods, etc. Stored within the application station is the computational power to carry out the authentication procedure disclosed in FIG. 1. Reader/writer unit 900 may itself be part of the application station 990 and its microprocessor 960, when provided with sufficient memory, is suited to carry out the authentication procedure. Also stored within the application station is the appropriate hardware to open a lock or remit cash. Such hardware is well known by those in the particular art to which the application station pertains. A discussion of certain of these applications follows.

APPLICATIONS

Computer Access Security System

Figure 6:
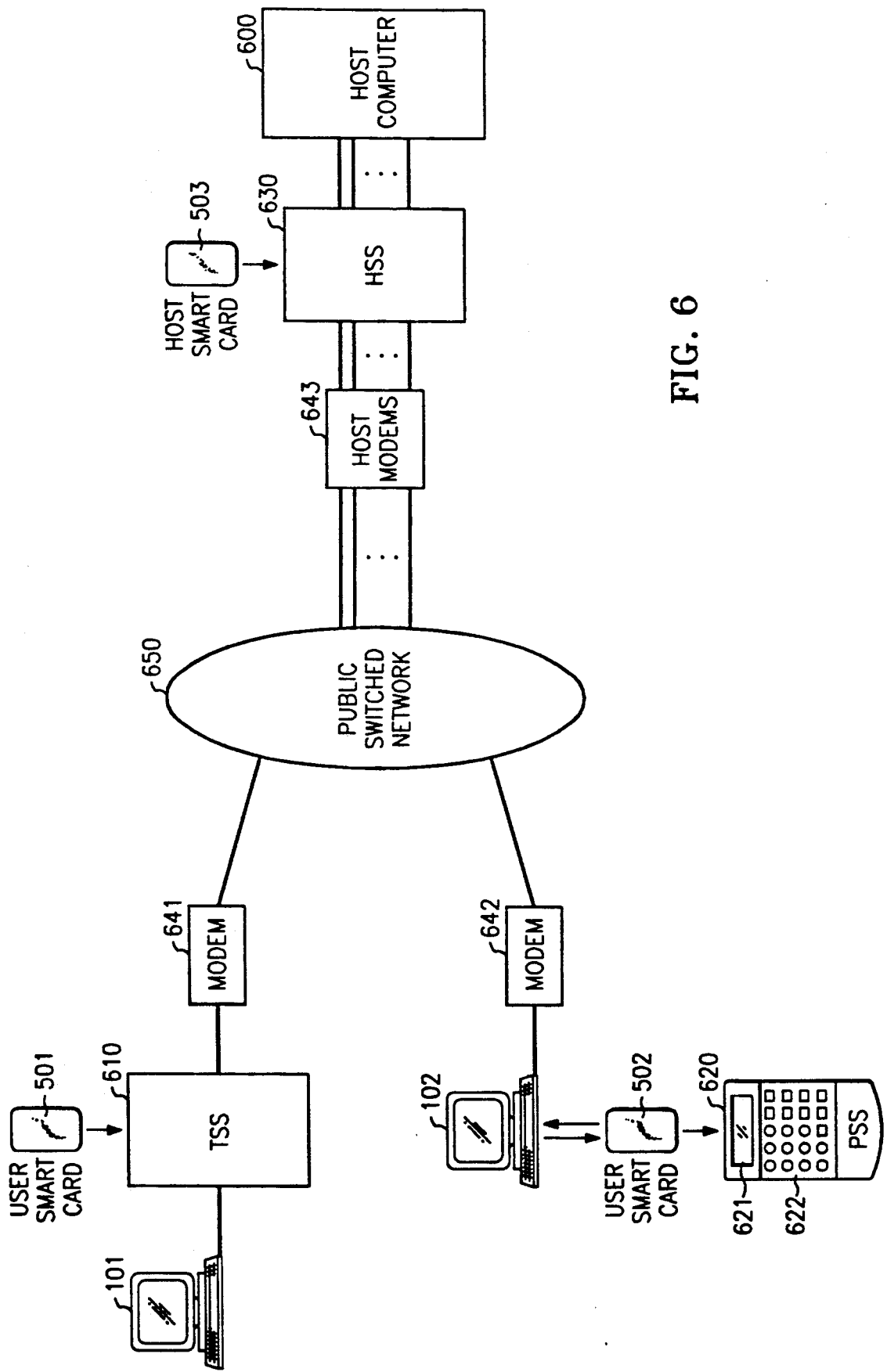
FIG. 6 illustrates use of the present invention in a computer access security system in accordance with the invention.

FIG. 6 discloses one application of the present invention in a computer access security system. In this system, terminal stations 101 and 102 provide access to host computer 600 so long as the user can be authenticated. In one situation, the user inserts his smart card 501 into a terminal security server (TSS) 610 for the purpose of verifying that he is entitled to access host computer 600. Modems 641 and 643 are frequently needed to adapt digital signals to transmission over public switched network 650. At the host location, host security server (HSS) 630, together with host smart card 503, grants access only to authorized users. In this application, TSS 610 includes a reader/writer unit 900 such as shown in FIG. 5, that interacts with smart card 501 to exchange electrical signals between the smart card and a particular application station. The user transmits his password to smart card 501 via terminal station 101 which commences the authentication process with HSS 630 and host smart card 503. Security is improved by storing the authentication algorithms and master strings within smart card 503 rather than in the host computer. Whereas a super-user might be able to access secret codes stored within the host computer 600, the host smart card is configured to only grant or deny access; secret information within the card 503 is not available to anyone after it has been entered. Since individual user ID numbers do not have to be stored in the present invention, it is possible to handle the authentication of vast numbers of users with minimal storage so that smart cards using EEPROMS of moderate size, say 2048 bytes, are adequate for the task. The authentication process performed in this application is the same as discussed above using DES or another suitable enciphering computation.

Variations of this system include the situation where the TSS 610 is replaced by a portable security server (PSS) 620. Here, the user types his identification number $(ID)_n$ into terminal station 102. $(ID)_n$ is then transmitted to HSS 630 which includes host smart card 503. HSS 630 returns a challenge number which is displayed on terminal station 102. The user then enters this challenge number into PSS 620 using keys 622. Contained within PSS 620 is smart card 502 which stores secret code $S_n$ and encryption algorithm $E_2$. It computes a response $R_n$ to the challenge number and displays it on liquid crystal display 621. Thereafter, the user enters $R_n$ into terminal station 102 and awaits access to host computer 600. Clearly, each terminal station 101,102 could contain the equipment presently housed within TSS 610 or PSS 620.

Premises Access Security System

An important application of the present invention is in connection with the replacement of conventional door locks and mechanical keys where high security is important. Smart cards are useful in this application because they can be selectively revoked and adapted for use only during predetermined hours. Further, they can be programmed to commence or expire on certain dates. The present invention is particularly advantageous in such a distributed system because the identity of each newly authorized user does not have to be communicated to each lock, although information regarding users no longer having authorization must be so communicated. The security of microwave "huts," which control vital junction points in the national telecommunication network, is of critical importance. Such locations warrant greater protection than easily duplicated mechanical keys can offer.

An example of a premises access security system is shown in FIG. 7 which illustrates another application of the present invention. Door 830 provides entry to a secure location such as a room or a building. Outside handle 850 does not normally operate the lock, but is provided merely for conveniently pushing or pulling on the door once the lock is open. A bolt assembly is driven by an inside handle (not shown) and includes a protrusion 840 which engages a strike 995 positioned in the door jamb. In the embodiment of FIG. 7, the strike itself is activated to permit the opening and closing of the door. Alternatively, the bolt within the door could have been controlled in accordance with the invention. Lock 800 is positioned adjacent the door jamb on wall 820 and includes a slot 810 for inserting an electronic key.

Referring now to FIG. 8, additional detail is provided regarding the hardware needed to support this particular application. In order to obtain access, the user first inserts his key 500 (smart card) into slot 810 (see FIG. 7) of lock 800. Once the key 500 is in contact with reader/writer unit 900, as discussed in connection with FIG. 5, authentication can begin. The user enters his password using the switches 120 on user interface 100 which is transferred to key 500 via reader/writer unit 900. If the entered password matches the password stored in memory 550 of key 500, then the key transmits its identification number $(ID)_n$ to application station 990, and more particularly to authentication device 700 which carries out the authentication procedure discussed in connection with FIG. 1. In the event that the key is authenticated, processor 760 delivers a pulse to relay driver 770 which activates relay 780 thereby closing contact K1. Power is now applied to electric strike 995 which enables the door to be pulled open. A suitable transducer for carrying out this function is the Model 712 Electric Strike, manufactured by Folger Adam Co. that requires 12 volts DC at 0.3 amperes. Information regarding door entry may be delivered to the user on display 110 of the user interface 100. Such information might include prompts for using the system, a message that the key has expired or that the password should be re-entered. Processor 760 includes memory for storing encryption algorithms $E_1$ and $E_2$ as well as a list of lost/stolen keys and those ID numbers that have been granted access to the facility over some time period. Such information can be delivered to, and displayed on, user interface 100 when properly commanded.

Multiple Secret Codes

Figure 10:
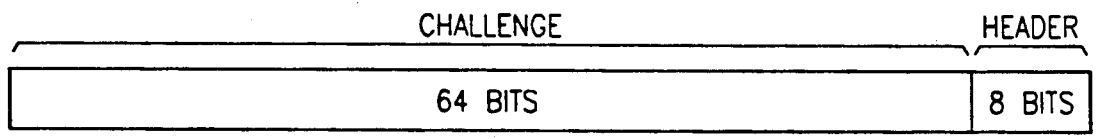
FIG. 10 illustrates the structure of a challenge signal including information regarding the selection of the secret code to be used during the encryption process.

In accordance with the present invention, the smart card may be used in connection with a plurality of authentication devices in which each device grants access to different user population. This is made possible by storing a plurality of secret codes within each smart card—very much like having a number of different keys on a single key ring. Knowing which secret code to use is communicated to the smart card when the challenge is delivered. Recall the challenge C comprises a 64-bit (8 byte) random number in the preferred embodiment. An additional byte (header) is added to the challenge, as shown in FIG. 10, that selects one of the secret codes $S_n$ stored within the memory of the smart card. Here, the header corresponds to the address of the particular secret code to be used in providing the correct response to the challenge. An 8-bit header accommodates 256 different secret codes, many of which may be used to enhance the security of a single authentication device. Perhaps 2 or 3 different challenges might be issued in an extremely high security application. In situations where 64-bits of random data are not necessary, various bit positions of the challenge number can be dedicated to identifying the particular secret code to be used.

Peer-to-Peer Authentication

In a number of situations, it is desirable for authentication to proceed between two members of a population who desire to exchange secret information after the identity of each member is verified to the satisfaction of the other. The present invention is useful in this regard because it does not require storage of the identification numbers of all members of the population. However, each of the smart cards must generate a challenge signal, store secret code $S_n$ as well as encryption algorithms $E_1$ and $E_2$, and compare response numbers $R_n$ with $R_n'$. Authentication proceeds in a manner similar to the procedure of FIG. 1, except that the combined functions of smart card 500 and authentication device 700 are now contained within a single, more powerful smart card. After the first smart card authenticates itself to the second, the second smart card authenticates itself to the first. This assures the first user that he has reached the correct destination, and it assures the second user that the person seeking access is entitled to it. Since each smart card now carries the secret master string, security is potentially weakened. However, the master string is not retrievable from memory and cannot be determined by trial and error within a reasonable time.

Although various particular embodiments have been disclosed or suggested, it is clear that others are possible within the spirit and scope of the invention. Further, modifications and variations of the present invention are possible and include, but are not limited to, the following: (i) smart cards are portable devices that may assume any convenient shape; (ii) smart cards may include metallic contacts although the disclosed contactless interface offers great resistance to external contaminants and electrical discharge; (iii) challenge numbers need not be random or even secret, although some degradation to security is inevitable; and (iv) encryption algorithms $E_1$ and $E_2$ may be less complex than DES and may even be implemented in hardware comprising no more than an Exclusive-OR gate.

We claim:

1. A system for enabling entry into a secure facility, the system including a portable object and means for transferring data between the portable object and the facility, the facility comprising:

memory means for storing encryption algorithms $E_1$ and $E_2$;

means for generating a challenge number;

means responsive to an identification signal, supplied by the portable object itself, that identifies the particular portable object seeking to gain access to the facility, and to encryption algorithm $E_1$ for generating a secret code;

means responsive to the challenge number, to the secret code and to encryption algorithm $E_2$ for generating a first response signal;

means for comparing the first response signal with a second response signal generated by the portable object, and for providing an enabling signal when the comparison is favorable;

the portable object comprising:

means for supplying the identification signal;

memory means for storing the secret code and the encryption algorithm $E_2$, but not encryption algorithm $E_1$ used for generating the secret code, said secret code and encryption algorithm $E_2$ having been previously generated and entered into the memory means; and means responsive to the secret code, to the challenge number received from the facility, and to encryption algorithm $E_2$ for generating the second response signal and transmitting same to the facility.

2. The system of claim 1 wherein the means for generating the secret code comprises a first processor, jointly responsive to the identification signal and to a secret master string, for executing a predetermined sequence of steps in accordance with encryption algorithm $E_1$, the secret master string being a plurality of numbers that are stored within the memory means of the facility.

3. The system of claim 1 wherein the means for generating the first response signal comprises a first processor, jointly responsive to the secret code and to the challenge number, for executing a predetermined sequence of steps in accordance with encryption algorithm $E_2$.

4. The system of claim 1 wherein the means for generating the second response signal comprises a second processor, responsive to the secret code and to the challenge number, for executing a predetermined sequence of steps in accordance with encryption algorithm $E_2$.

5. The system of claim 2 wherein encryption algorithm $E_1$ is a process for encrypting data in accordance with the Data Encryption Standard.

6. The system of claim 4 wherein encryption algorithm $E_2$ is a process for encrypting data in accordance with the Data Encryption Standard.

7. The system of claim 1 wherein the challenge number is substantially random.

8. A portable electronic device for use in obtaining access to a secure facility comprising:

memory means storing an identification number, a secret code, and an encryption process $E_2$, the secret code having been formed by an encryption process $E_1$ using the identification number and a secret master string, but not storing encryption algorithm $E_1$ itself, said secret code and encryption algorithm $E_2$ having been previously generated and entered into the memory means;

a processor, responsive to (i) a received challenge number, (ii) the secret code, and (iii) encryption process $E_2$, for generating and transmitting a signal in response to the challenge number; whereby the portable electronic device can authenticate itself to an authentication apparatus which does not store a list of acceptable identification numbers.

9. A system for controlling access to a plurality of secure facilities, the system including a portable object and means for transferring data between the portable object and each of the facilities, the portable object comprising:
means for supplying an identification signal;
means for storing two or more secret codes and an encryption algorithm $E_2$, but not storing any encryption algorithm used for generating the secret codes, said secret codes and encryption algorithm $E_2$ having been previously generated and entered into the storing means;
means responsive to a code selection signal, received from one of the facilities, for selecting one of the secret codes;
means responsive to the selected secret code, to a challenge number received from said one of the facilities, and to $E_2$ for generating a first response signal;

said one of the facilities comprising:
memory means for storing encryption algorithms $E_1$ and $E_2$;
means for generating a challenge number;
means for generating the code selection signal;
means responsive to said identification signal, supplied by the portable object itself, that identifies the particular portable object seeking to gain access to the facility, and to encryption algorithm $E_1$ for generating the secret code;
means responsive to the challenge number, the secret code and $E_2$ for generating a second response signal; and
means for comparing the first and second response signals and denying access to the secure facility when the comparison is not favorable.

10. The system of claim 9 wherein the challenge number includes the code selection signal.

11. The system of claim 9 wherein the facility further includes:
means for storing a list of identification numbers not entitled to access the secure facility; and
means for determining correspondence between the stored list of identification numbers and the identification signal that identifies the particular portable object seeking access to the facility; whereby access to the facility will be denied when such correspondence exists.

12. A system for controlling access to a secure facility, the system including a portable object and means for transferring data between the portable object and the facility, the portable object comprising:
means for supplying an identification signal;
means for storing two or more secret codes and an encryption algorithm $E_2$;
means responsive to a code selection signal, received from the facility, for selecting one of the secret codes;
means responsive to the selected secret code, to a challenge signal received from the facility, and to $E_2$ for generating a first response signal;

the facility comprising:
memory means for storing encryption algorithms $E_1$ and $E_2$;
means for generating said challenge signal;
means for generating the code selection signal;
means responsive to said identification signal, supplied by the portable object itself, that identifies the particular portable object seeking to gain access to the facility, and to encryption algorithm $E_1$ for generating the secret code;
means responsive to the challenge signal, the secret code and $E_2$ for generating a second response signal; and
means for comparing the first and second response signals; whereby favorable comparison is required for obtaining access to the secure facility.

13. A door lock system including an electronic key, a door, support structure for the door, and an electronic lock;

the electronic lock comprising:
means for exchanging electrical data with the electronic key;

means responsive to an identification signal, proffered by the electronic key, for converting same into a secret code number;

means for generating a challenge number and communicating same to the electronic key;

means responsive to the challenge number and to the secret code number for generating a first response number;

means for comparing the first response number with a second response number, the second response number having been generated by the electronic key in response to the challenge number; and means for unlocking the door when the comparison between the first and second response numbers is favorable;

the electronic key comprising means for supplying the identification signal;

memory means for storing the secret code number, but not storing the means for converting the identification signal into the secret code number, said secret code number having been previously generated and entered into the memory means;

means responsive to the secret code number and to the challenge number for generating the second response number and communicating same to the electronic lock.

14. The system of claim 13 wherein the means for converting the proffered identification signal into the secret code number comprises a processor which is jointly responsive to the identification signal and to a master string in executing a predetermined sequence of steps of a first encryption algorithm $E_1$, the master string comprising a plurality of secret numbers that are stored within a memory of the electronic lock.

15. The system of claim 13 wherein the means for generating the first response number comprises said processor which is jointly responsive to the secret code number and to the challenge number in executing a predetermined sequence of steps of a second encryption algorithm $E_2$.

16. The system of claim 14 wherein encryption algorithm $E_1$ is a process for encrypting data in accordance with the Data Encryption Standard.

17. The system of claim 15 wherein encryption algorithm $E_2$ is a process for encrypting data in accordance with the Data Encryption Standard.

18. The system of claim 13 wherein the challenge number is substantially random.

19. The system of claim 13 wherein the electronic lock is positioned on the support structure for the door.

20. The system of claim 19 wherein the support structure of the door further includes a user interface having a keyboard device for the user to enter information for the purpose of identifying himself in addition to identification information provided by the electronic key.

21. A system for enabling entry into a secure facility, the system including a portable object and means for transferring data between the portable object and the facility, the facility comprising:

memory means for storing encryption algorithms $E_1$ and $E_2$;

means for generating a challenge number;

means responsive to an identification signal, supplied by the holder of the portable object through a keyboard device, that identifies the particular portable object seeking to gain access to the facility, and to encryption algorithm $E_1$ for generating a secret code;

means responsive to the challenge number, to the secret code and to encryption algorithm $E_2$ for generating a first response signal;

means for comparing the first response signal with a second response signal generated by the portable object, and for providing an enabling signal when the comparison is favorable;

the portable object comprising:

memory means for storing the secret code and the encryption algorithm $E_2$, but not encryption algorithm $E_1$ used for generating the secret code, said secret code and encryption algorithm $E_2$ having been previously generated and entered into the memory means; and means responsive to the secret code, to the challenge number received from the facility, and to encryption algorithm $E_2$ for generating the second response signal and transmitting same to the facility.

22. A system for controlling access to a plurality of secure facilities, the system including a portable object and means for transferring data between the portable object and each of the facilities, the portable object comprising:

means for storing two or more secret codes and an encryption algorithm $E_2$, but not storing any encryption algorithm used for generating the secret codes, said secret codes and encryption algorithm $E_2$ having been previously generated and entered into the storing means;

means responsive to a code selection signal, received from one of the facilities, for selecting one of the secret codes;

means responsive to the selected secret code, to a challenge number received from said one of the facilities, and to $E_2$ for generating a first response signal;

said one of the facilities comprising:

memory means for storing encryption algorithms $E_1$ and $E_2$;

means for generating said challenge number;

means for generating the code selection signal;

means responsive to an identification signal, supplied by a holder of the portable object through a keyboard device, that identifies the particular portable object seeking to gain access to the facility, and to encryption algorithm $E_1$ for generating the secret code;

means responsive to the challenge number, the secret code and $E_2$ for generating a second response signal; and means for comparing the first and second response signals and denying access to the secure facility when the comparison is not favorable.

23. A system for controlling access to a secure facility, the system including a portable object and means for transferring data between the portable object and the facility, the portable object comprising:

means for storing two or more secret codes and an encryption algorithm means responsive to a code selection signal, received from the facility, for selecting one of the secret codes;

means responsive to the selected secret code, to a challenge signal received from the facility, and to $E_2$ for generating a first response signal;

the facility comprising:

memory means for storing encryption algorithms $E_1$ and $E_2$;

means for generating said challenge signal;

means for generating the code selection signal;

means responsive to an identification signal, supplied by a holder of the portable object through a keyboard device, that identifies the particular portable object seeking to gain access to the facility, and to encryption algorithm $E_1$ for generating the secret code;

means responsive to the challenge signal, the secret code and $E_2$ for generating a second response signal; and means for comparing the first and second response signals; whereby favorable comparison is required for obtaining access to the secure facility.

24. A door lock system including an electronic key, a door, support structure for the door, and an electronic lock;

the electronic lock comprising:

means for exchanging electrical data with the electronic key;

means responsive to an identification signal, proffered by a user of the electronic key through a keyboard device, for converting same into a secret code number;

means for generating a challenge number and for communicating same to the electronic key;

means responsive to the challenge number and to the secret code number for generating a first response number;

means for comparing the first response number with a second response number, the second response number having been generated by the electronic key in response to the challenge number; and means for unlocking the door when the comparison between the first and second response numbers is favorable;

the electronic key comprising memory means for storing the secret code number, but not storing the means for converting the identification signal into the secret code number, said secret code number having been previously generated and entered into the memory means;

means responsive to the secret code number and to the challenge number for generating the second response number and communicating same to the electronic lock.

* * * * *